Feb. 28, 1928.                                                 1,660,891
J. C. SEARLE, SR
SOIL IRRIGATOR
Filed Oct. 12, 1925         3 Sheets-Sheet 2
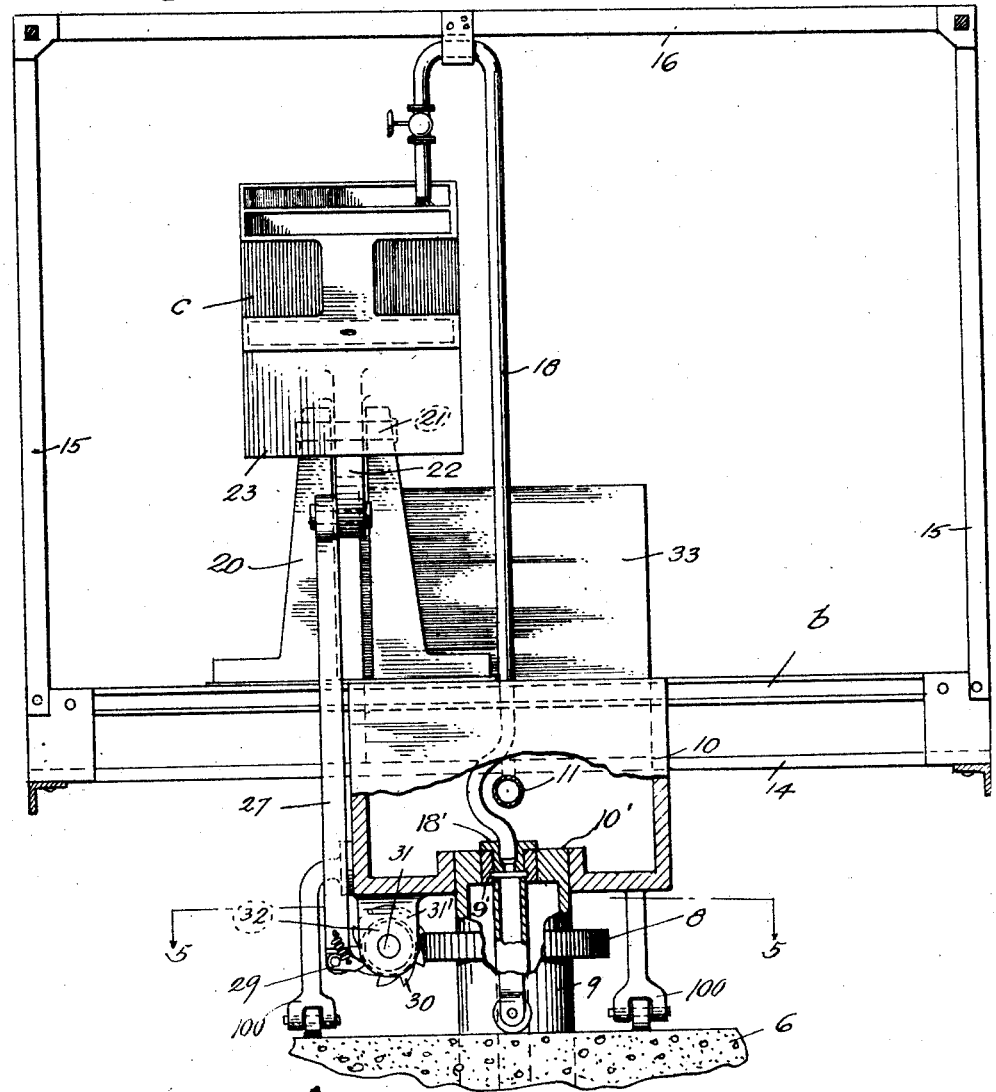
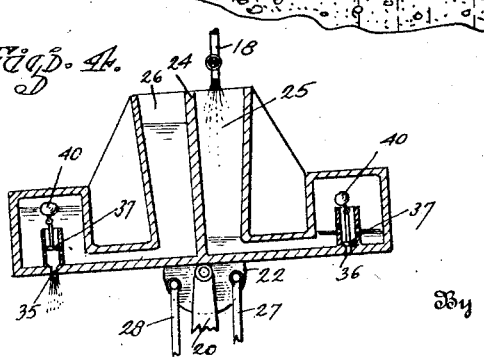
Inventor
JOHN COOPER SEARLE, SR.
By
Attorneys.

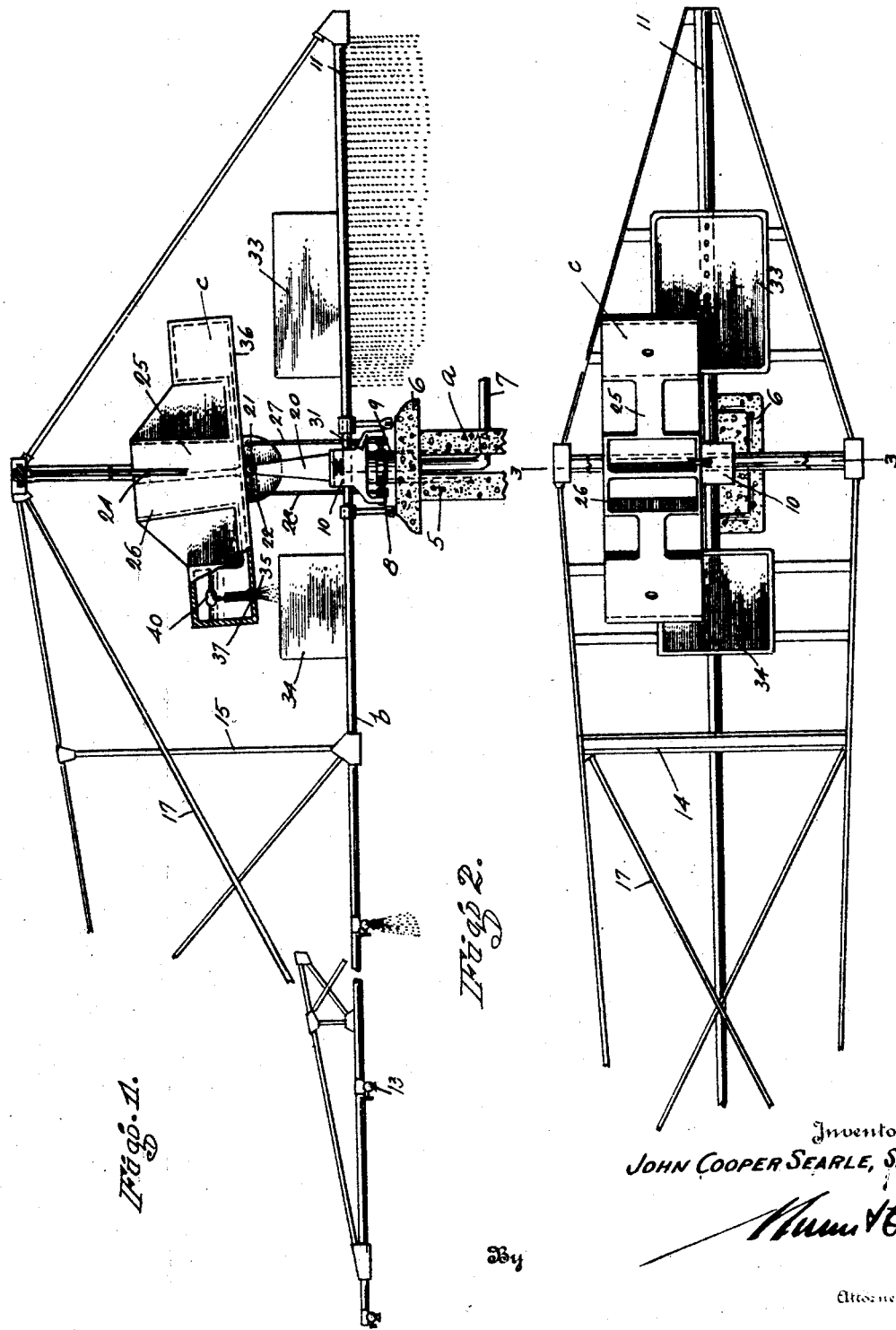

Feb. 28, 1928.

J. C. SEARLE, SR 1,660,891

SOIL IRRIGATOR

Filed Oct. 12, 1925

INVENTOR
JOHN COOPER SEARLE, SR.
BY
ATTORNEYS.

Patented Feb. 28, 1928.

1,660,891

UNITED STATES PATENT OFFICE.

JOHN COOPER SEARLE, SR., OF HONOLULU, TERRITORY OF HAWAII, ASSIGNOR OF ONE-TWENTIETH TO JOHN COOPER SEARLE, JR., OF LOS ANGELES, CALIFORNIA; ONE-TWENTIETH TO EDWARD COOPER SEARLE, OF HILO, TERRITORY OF HAWAII; ONE-TWENTIETH TO THEODORE COOPER SEARLE, OF HONOLULU, TERRITORY OF HAWAII; ONE-TWENTIETH TO MELVILLE COOPER SEARLE AND ONE-TWENTIETH TO CLARENCE COOPER SEARLE, BOTH OF SAN FRANCISCO, CALIFORNIA.

SOIL IRRIGATOR.

Application filed October 12, 1925. Serial No. 62,130.

The present invention relates to improvements in soil irrigating apparatus of the type shown in my former Patent No. 1,107,119, dated August 11th, 1914.

The general object of my invention is the provision of an apparatus adapted for conveying water from a relatively remote point of supply, and operating automatically in response to the flow of the conveyed water to distribute the same uniformly over a relatively large circular area of ground.

The above and other objects are accomplished by instrumentalities pointed out in the following specification.

The invention is clearly defined in the claim.

A satisfactory embodiment of the invention is illustrated in the accompanying drawings forming part of the specification and in which—

Figure 1 is a contracted side elevation of my device in use, parts thereof being broken away to disclose the construction and relation of other parts.

Figure 2 is a plan view of Figure 1.

Figure 3 is a detail cross-section on the line 3—3 of Figure 2.

Figure 4 is a detail longitudinal section of the gravity operated tank for propelling the sprinkler arm.

Figure 5:
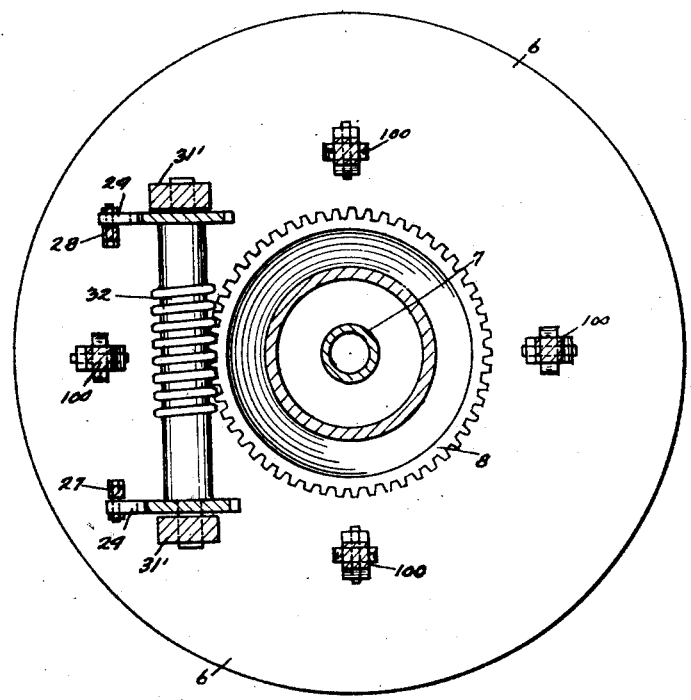
Figure 5 is a section along the line 5—5 of Figure 3.

In carrying out my invention, I provide a tower $a$. In the embodiment shown, this tower is anchored to the ground and forms one of a series of towers erected at different selected portions of the entire area to be irrigated. Water may be pumped to these towers from an ordinary irrigation ditch or the towers may be piped to a water main and water conveyed by gravity. It is to be understood, however, that this description of my device is simply illustrative and, from what will hereinafter appear when taken in connection with my prior patent above referred to, it will be readily understood that the device of this invention is susceptible of being incorporated into the structure shown in the said patent for a travelling irrigator in lieu of the sprinkler arms shown therein, in which event the irrigating medium could be delivered to the sprinkler arm in the manner shown in the said patent or by any other well-known means.

In the embodiment shown, the tower $a$ is a skeleton structure formed of a plurality of concrete pillars 5 upon the upper end of which is disposed a cap stone 6. A water pipe 7 passes vertically upward through the center of the stone 6 and through the center of a worm wheel 8 which is rigidly supported against rotation upon the upper end portion of a tubular base 9 which provides a bearing for a rotatable head 10 at 10', see Figure 3. The rotatable head 10 is supported by rollers 100. One end portion of a sprinkler arm $b$ is connected to the head 10 and is rotatable with the head. The pipe 11 of the sprinkler arm extends horizontally and is of relatively great length and so disposed that one end portion projects beyond the head for a distance less than the other end portion. The pipe is preferably tapered throughout its longer projecting end portion and toward the free end thereof so that the weight will be progressively reduced from the inner to the outer end of the said longer projecting portion. I provide a series of nozzles 13 on the lower side of the longer projecting end pipe 11, and these nozzles are valve controlled so as to be adjusted, and operate with the tapered bore of the pipe to provide for a uniform distribution of water throughout the length of the longer projecting portion of the pipe. The innermost of the nozzles 13 is spaced from the head approximately for a distance equal to the length of the shorter projecting end portion of the pipe, and the latter on its inside is provided with a series of outlet openings which deliver water to the surface of the ground in the area included between the innermost nozzle 13 and the head 10.

In the construction shown the sprinkler arm is formed by securing a series of cross bars 14 in spaced relation upon the pipe 11. Uprights 15 are connected to the opposite ends of the cross bars and support at their upper ends cross bars 16, the adjacent uprights being connected by truss rods 17. In this way the pipe 11 is held supported by a truss. An outlet section 18 is swiveled to the upper end of the water pipe 7 and is adapted to be connected to an upper cross member of the truss. Figure 3 shows the section 18 connected to a cap 18' which in turn is rotatable in a coupling 9'. The coupling connects the section 18 to the pipe 7 and is also carried by the tubular base 9. The section 18 further operates as a head and brace for the truss and is adapted to turn with the sprinkler arm. The free end portion of the section 18 is curved downwardly and constitutes the delivery end of the water pipe 7. A bracket 20 extends vertically upward from a platform supported by the truss, and is disposed to one side of the water pipe 7. The bracket is provided with a cross bar 21 which forms a bearing for a web 22 that depends from the central portion of the bottom 23 of a gravity actuated tank $c$. The upper end of the tank is open and underlies the delivery end of the rotatable extension 18 of the water pipe, and a partition 24 extending transversely of the central portion of the tank divides the tank interiorly into compartments 25 and 26. A pair of depending rods 27 and 28 are pivoted to opposite side portions of the web 22, and their lower end portions are provided with pawls 29 which are adapted to alternately engage with oppositely disposed ratchets 30 on the opposite ends of a worm shaft 31 that meshes with the worm wheel 8 and is journaled in the lower ends of hangers 31' secured to the sprinkler arm $b$. The pawls 29 are so disposed as not to engage with their respective ratchets when the tank $c$ is in equilibrium; but when the tank rocks to either side, one of the rods is raised and the other lowered, and the pawl of the latter rod then engages its respective ratchet and operates to turn the same under the pressure transmitted thereto from the tank. The turning of the ratchet rotates the worm 32 and advances the same upon the worm wheel 8, so that the turning movement is imparted to the sprinkler arm.

A pair of tanks 33 and 34 are disposed on either side of the head 10 and communicate with the water pipe 11. These tanks have upper open ends and are respectively disposed directly underneath the outlets 35 and 36 of the compartments 25 and 26 of the tank $c$. The outlets 35 and 36 are controlled by valves, as indicated by 37, and the valves 37 are operated by floats 40. The tank 33 on the shorter extension of the pipe 13 is considerably greater in capacity than the opposite tank 34, so that the increase in weight resulting from the enlarged tank 33 will in a measure counterbalance the weight of the opposite end portion of the sprinkler arm.

In operation, the tank $c$ is initially tilted to one side or the other so that only one of the compartments thereof alines with the tilted end of the water pipe. The tank is held in this position until the space within the compartment receiving water is filled at which time the float 40 of that compartment trips the valve 37 and the water discharges through the outlet and into one of the lower tanks. The preponderating weight of the water will operate upon release of the tank to tilt the same, whereupon the opposite compartment will be rocked into position to receive water. Water will then flow into the last named compartment until the valve thereof is opened by the action of the water upon the float. In this way the tank $c$ is automatically rocked and the sprinkler arm $b$ caused to rotate and deliver the water upon the area of ground located therebeneath.

Although I have shown and described one embodiment of my invention, it is to be understood that the same is susceptible of various changes; and I reserve the right to employ such as may come within the scope of the appended claim.

I claim:

A soil irrigating device comprising a tower, a water supply pipe having a rotatable outlet end portion connected to the upper end portion of the tower, a sprinkler arm rotatably connected to the tower below the outlet of the supply pipe, a driving connection between the tower and the arm including a worm gear rigidly secured to the tower and a worm rotatably mounted upon the arm, a ratchet secured to the worm, a compartmental oscillating water holding receptacle connected to the arm and arranged to receive water discharged from the outlet end of the supply pipe and deliver the water to the arm, said receptacle having a pawl engaging the ratchet and movable by the weight of a quantity of water discharged into one of its compartments to operate the worm to turn the sprinkler arm.

JOHN COOPER SEARLE, Sr.